P. A. JOHNSON.
PIPE COUPLING.
APPLICATION FILED JAN. 12, 1909.
929,858.
Patented Aug. 3, 1909.
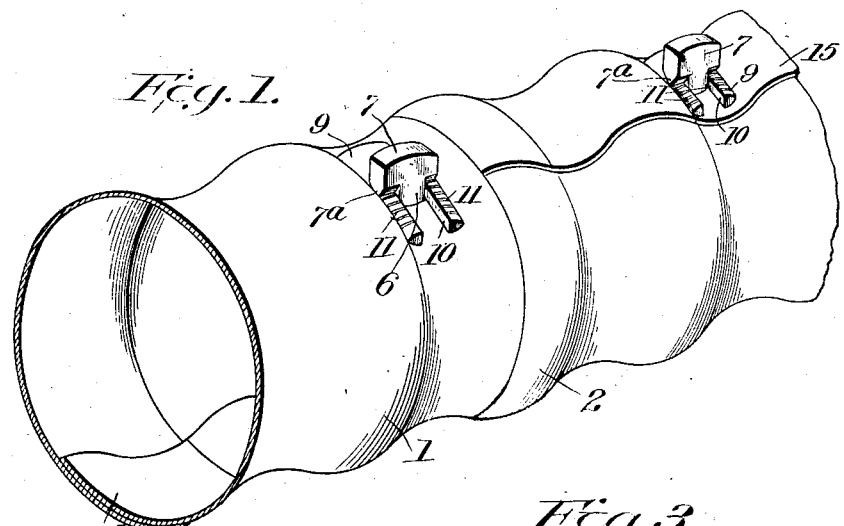
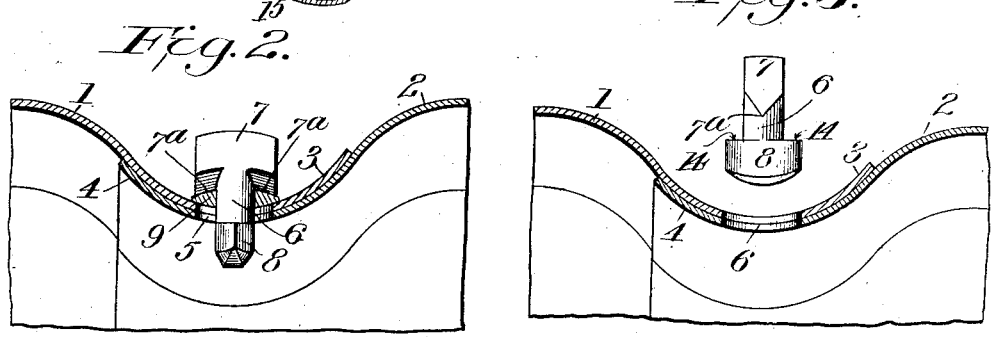
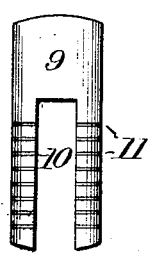
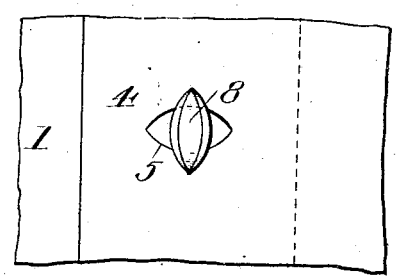
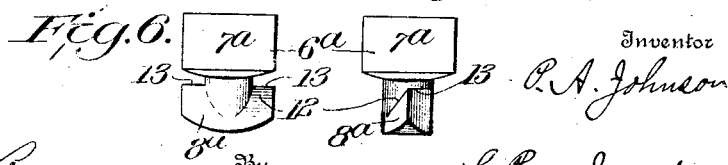

UNITED STATES PATENT OFFICE.

PETER A. JOHNSON, OF LYLE, MINNESOTA.

PIPE-COUPLING.

No. 929,858.  Specification of Letters Patent.  Patented Aug. 3, 1909.

Application filed January 12, 1909. Serial No. 471,968.

*To all whom it may concern:*

Be it known that I, PETER A. JOHNSON, a citizen of the United States, residing at Lyle, in the county of Mower and State of Minnesota, have invented certain new and useful Improvements in Pipe-Couplings, of which the following is a specification.

This invention relates to pipe couplings, and more particularly to coupling devices for connecting together sections of metallic pipes or corrugated sections of culverts.

The object of my invention is to provide a fastening or coupling device which may be quickly inserted and secured or locked in place on the outside of a culvert or water main and without the expense and time required for riveting together adjacent sections.

The matter constituting my invention will be set forth in the claims.

The details of construction and arrangement of parts are illustrated in the accompanying drawings, in which—

Figure 1 represents a perspective view of portions of two connected pipe sections showing the coupling device in position. Fig. 2 represents a longitudinal section of portions of connected corrugated pipe sections, showing the coupling device in locked position. Fig. 3 represents a similar section showing the coupling device detached. Figs. 4 and 4ª represent, respectively, a top plan view and an edge view of a keeper. Fig. 5 represents an inner face view of portions of overlapped pipe sections. Figs. 6 and 7 represent, respectively, side views of a modified form of key, one view being at right angles to the other.

The culvert or pipe sections 1 and 2 may be made of corrugated metal in which the circumferential corrugations extend throughout the length of each section or in which each section is provided at its ends with overlapped corrugations. The end corrugations 3 and 4 overlap one another as shown in Fig. 2 and each of said corrugations is provided, preferably in its contracted portion, with an elliptical or elongated opening 5 with its longest axis placed longitudinally or parallel with the axis of the culvert as indicated in Figs. 2, 3 and 5. These elongated openings are made in the overlapping end corrugations at one or more points in the circumference and will be made at suitable intervals in the longitudinal lap-joint 15. In all cases the openings are preferably made in the contracted portions of the corrugations, as indicated in Fig. 2.

For the purpose of quickly securing the end corrugations and longitudinal lap-joints together I provide a key 6 having an upper elongated head 7 provided on its under side with downwardly projecting sharp edges or teeth 7ª, as shown in Fig. 3. In this figure the key 7 is shown in position to be inserted into the opening 5. The key is made with a short shank which is provided with a lower elliptical or elongated head 8 at right angles to the head 7 and having upper bearing shoulders 14. The head 8 is of the same shape as the opening 5 and of a size to pass through it with a close fit. In connection with the key 6 I use a wedge shaped keeper or lock device 9, consisting of an elongated piece of metal having a deep longitudinal slot 10 of the proper width to closely engage the shank of the key. The upper surface of this keeper is made with transverse notches 11 for receiving the sharp edges of the teeth 7ª on the head of the key. The keeper or lock device 9 is made thicker at its rear closed end and tapered toward the open end, as shown in Fig. 4ª. The elliptical lower head 8 being passed through the openings 5 in overlapped corrugations, the key will be given a one quarter turn so that the lower head will be turned across the openings 5, as shown in Figs. 2 and 5, and then the wedge-shaped keeper piece 9 will be pushed under the outer head 7 until the parts are closely drawn together and the teeth 7ª engaged in the notches 11. The keeper piece 9 will rest in a concave portion of a corrugation and, on account of the spring in the overlapping metal, will be securely held in place by the engaging teeth and notches. The keys and keepers can be very quickly inserted from the outside of the culvert and are so engaged as to securely hold the overlapping corrugations or edges of the seam together.

In modified form of key 6ª, shown in Figs. 6 and 7, the outer head 7ª may be square, and the shank may be very short, only long enough to pass through the thickness of the overlapping metal between the outer and inner heads. The inner head 8ª is made with lateral projections having inclined or beveled upper faces 12 on opposite sides and upper bearing shoulders 13. Owing to the convexity of the inner surface of the corrugated metal the lower head 8ª will pass through the elongated opening 5 so that the upper bearing shoulders 13 will project slightly inward from the surface. Now by giving the key a one quarter turn the beveled faces 12 will readily slide over the convex surface of the metal until the shoulders bear firmly upon the most inwardly curved portion of the corrugation and securely hold the parts together. For many purposes this makes a convenient and satisfactory coupling device.

The longitudinal lap seam 15 in the pipe sections may have two or more of the coupling devices, according to the length of the section, for holding the parts together. Since the outer heads and keepers of the coupling device are placed in the contracted portions of the corrugations they will be out of the way and protected from accidental derangement.

Having described my invention, what I claim as new and desire to secure by Letters Patent, is—

1. A pipe coupling, comprising a key having a shank, an outer head, an elongated inner head with lateral projections at right angles to the outer head and a keeper device adapted to bear on the pipe below the outer head, substantially as described.

2. In a pipe coupling, the combination with overlapping corrugated parts having elongated openings, of a key having an outer head and an elongated inner head adapted to be inserted through said openings and turned to engage and hold the parts together, whereby the pipe sections may be coupled from the outside, substantially as described.

3. In a pipe coupling, the combination with overlapping corrugated parts having elongated openings with their longest axes across the corrugations, of a key having an outer head and an elongated inner head adapted to be inserted through said openings and turned to engage and hold the parts together, whereby the pipe sections may be coupled from the outside, substantially as described.

4. A coupling for corrugated pipe, comprising overlapping corrugations having transverse elongated openings, a key having an outer head provided with downwardly projecting teeth, an elongated inner head adapted to be inserted through said openings and turned at right angles and a slotted keeper adapted to be pushed under the outer head and engaged with its teeth for securely holding the parts together, substantially as described.

5. A coupling for corrugated pipe, comprising overlapping corrugations having transverse elongated openings in the contracted or inwardly curved portions of the corrugations, a key having an outer head provided with downwardly projecting teeth, an elongated inner head to be inserted through said openings and turned at right angles and a slotted tapering keeper having transverse notches and adapted to be pushed under the outer head and engaged with its teeth for securely holding the parts together, substantially as described.

In testimony whereof I affix my signature, in presence of two witnesses.

PETER A. JOHNSON.

Witnesses:
OLE H. LINDEE,
GEO. M. ANDERSON.